United States Patent
Lowrey et al.

(10) Patent No.: US 6,611,740 B2
(45) Date of Patent: Aug. 26, 2003

(54) INTERNET-BASED VEHICLE-DIAGNOSTIC SYSTEM

(75) Inventors: Larkin Hill Lowrey, La Jolla, CA (US); Matthew J. Banet, Del Mar, CA (US); Bruce Lightner, La Jolla, CA (US); Diego Borrego, San Diego, CA (US); Chuck Myers, La Jolla, CA (US); Wade Williams, San Diego, CA (US)

(73) Assignee: NetworkCar, San Diego, CA (US)

( * ) Notice: Subject to any disclaimer, the term of this patent is extended or adjusted under 35 U.S.C. 154(b) by 0 days.

(21) Appl. No.: 09/808,690

(22) Filed: Mar. 14, 2001

(65) Prior Publication Data

US 2002/0133273 A1 Sep. 19, 2002

(51) Int. Cl.$^7$ .................... G01M 17/00; G06F 7/00; G06F 17/00; G06F 19/00
(52) U.S. Cl. .................... 701/29; 709/200; 709/260; 702/182; 702/183; 707/1; 707/102; 379/1.01; 379/219
(58) Field of Search .................... 701/35, 29, 115, 701/33, 32, 102, 114; 709/200, 207, 240; 340/439, 438, 459; 700/29; 123/436; 702/187, 184, 185, 183, 182; 707/203, 1, 100, 102; 379/1.01, 219; 370/313, 401, 328; 455/457, 404, 563

(56) References Cited

U.S. PATENT DOCUMENTS

| | | | | |
|---|---|---|---|---|
| 4,258,421 A | * | 3/1981 | Juhasz et al. | 340/870.16 |
| 4,602,127 A | * | 7/1986 | Neely et al. | 360/53 |
| 5,157,610 A | * | 10/1992 | Asano et al. | 340/438 |
| 5,442,553 A | | 8/1995 | Parrillo | 701/33 |
| 5,450,321 A | * | 9/1995 | Crane | 307/10.6 |
| 5,463,567 A | * | 10/1995 | Boen et al. | 701/33 |
| 5,479,479 A | | 12/1995 | Braitberg et al. | 379/58 |
| 5,574,427 A | | 11/1996 | Cavallaro | 340/436 |
| 5,732,074 A | * | 3/1998 | Spaur et al. | 370/313 |
| 5,737,215 A | * | 4/1998 | Schricker et al. | 700/29 |
| 5,754,965 A | * | 5/1998 | Hagenbuch | 340/439 |
| 5,758,300 A | | 5/1998 | Abe | 701/33 |
| 5,797,134 A | | 8/1998 | McMillan et al. | 705/400 |
| 6,064,970 A | | 5/2000 | McMillan et al. | 705/4 |
| 6,295,492 B1 | | 9/2001 | Lang et al. | 701/33 |
| 6,338,152 B1 | * | 1/2002 | Fera et al. | 709/207 |

FOREIGN PATENT DOCUMENTS

WO    WO 00/79727    12/2000

* cited by examiner

Primary Examiner—Thomas G. Black
Assistant Examiner—Ronnie Mancho
(74) Attorney, Agent, or Firm—Hale and Dorr LLP

(57) ABSTRACT

The invention provides a system for monitoring a vehicle that includes a wireless appliance in electrical contact with an in-vehicle computer. The wireless appliance features: 1) a data-collection component that supports communication software that collects diagnostic data from the computer; and 2) a data-transmission component, in electrical communication with the data-collection electronics, configured to transmit an outgoing data packet comprising the diagnostic data over a network and receive over the same network an incoming data packet that modifies the communication software. The wireless appliance communicates with a host computer system that is configured to: 1) receive the outgoing data packet from the network; 2) process the outgoing data packet to generate a set of vehicle diagnostic data; 3) host a web site on the Internet that displays the vehicle diagnostic data; and 4) send out the incoming data packet over the same network to modify the communication software.

33 Claims, 11 Drawing Sheets

KNOW WHAT YOUR CAR IS THINKING.™  [Log Out] [Help]

Customer List

Search For All Customers and Found 24 record(s).

Skip to page [1] of 1 [GO]

| Customer | Car (Year, Model) | VIN | Alerts |
|---|---|---|---|
| A, Shuttle | 2000 TOYOTA PREVIA | 4T3ZF13C1YU231434 | 0 |
| B, Shuttle | 2000 TOYOTA SIENNA | 4T3ZF19C51U354974 | 0 |
| Benson, Gary | 2000 TOYOTA TACOMA | 4TAWN72N5YZ625252 | 0 |
| Bilgrien, Rick | 2001 TOYOTA TUNDRA | 5TBRT34101S153441 | 0 |
| Bushnell, Bill | 2001 TOYOTA AVALON | 4T1BF28B51U115644 | 0 |
| Dangel, Dayton | 2001 TOYOTA TUNDRA | 5TBRT34151S146629 | 1 |
| Edwards, Barbara | 2000 TOYOTA CAMRY | JT2BG22K710568044 | 0 |
| Five, Loaner | 2001 TOYOTA COROLLA | 1NXBR12EX1Z460589 | 1 |
| Gerard, Jerry | 2001 TOYOTA CAMRY | 4T1BG22K21U768728 | 1 |
| Greenlaw, Dana | 2000 TOYOTA TACOMA | 5TESN92N9YZ699955 | 0 |
| Grudek, Mandi | 2001 TOYOTA COROLLA | 1NXBR12E41Z473970 | 0 |
| Heyden, Lee | 2000 TOYOTA CAMRY | JT2BG22K4Y0484936 | 1 |
| Lizaide, Gus | 2001 TOYOTA CAMRY | JT2BG22K810563788 | 0 |
| Mendelson, Ivan | 2001 TOYOTA CAMRY | JT2BG22KX10541288 | 1 |
| Novello, Leo | 2001 TOYOTA TUNDRA | 5TBRT34161S145439 | 1 |
| Pereira, Tony | 2001 TOYOTA CAMRY | JT2BG22KX10550217 | 0 |
| Prasad, Sharon | 2001 TOYOTA COROLLA | 1NXBR12E91Z474788 | 0 |
| Santana, Octavio | 2001 TOYOTA TACOMA | 5TEVL52N81Z741680 | 0 |
| Scetonas, Bob | 2001 TOYOTA 4RUNNER | JT3GN87R010182856 | 0 |
| Schuler, Howard | 2000 TOYOTA SIENNA | 4T3ZF13C8YU259988 | 0 |
| Seven, Loaner | 2001 TOYOTA COROLLA | 1NXBR12E51Z460547 | 0 |
| Steagall, Jack | 2001 TOYOTA CAMRY | JT2BG22K810533030 | 0 |
| Two, Loaner | 2001 TOYOTA COROLLA | 1NXBR12E41Z455761 | 0 |
| Weston, Dale | 2001 TOYOTA CAMRY | JT2BG22K9Y0426112 | 1 |

FIG. 5

| | |
|---|---|
| Calculated Load Value - OBDII Data | 53 % |
| Air Flow Rate MAF Sensor - OBDII Data | 3.76 gm/s |
| Engine RPM - OBDII Data | 446 RPM |
| Engine Coolant Temp. - OBDII Data | 190 degF |
| Intake Air Temp. - OBDII Data | 66 degF |
| Abs. Throttle Position Sensor - OBDII Data | 18 % |
| Vehicle Speed - OBDII Data | 0 MPH |
| Short Term Fuel Trim /B1 - OBDII Data | 1 % |
| Long Term Fuel Trim /B1 - OBDII Data | -4 % |
| MIL Light - OBDII Data | off |
| B1S2 Voltage - OBDII Data | 0.880 V |
| Oxygen Sensor Location - OBDII Data | B1S1 B1S2 B2S1 B2S2 |
| B1S1 Fuel Trim - OBDII Data | 0 % |
| B1S1 Voltage - OBDII Data | 0.425 V |
| B1S2 Fuel Trim - OBDII Data | 100 % |
| B2S1 Fuel Trim - OBDII Data | 0 % |
| B2S1 Voltage - OBDII Data | 0.900 V |
| B2S2 Fuel Trim - OBDII Data | 100 % |
| B2S2 Voltage - OBDII Data | 0.900 V |
| OBD system type - OBDII Data | 1 |

| | | |
|---|---|---|
| EGR dutycycle to EVR - Ford Specific Data | 0.00 % | |
| Delta Pressure Feedback EGR pressure sensor - Ford Specific Data | 1.015 V | |
| Evaporative Purge Solenoid dutycycle - Ford Specific Data | 19.33 % | |
| Fuel Level Input Sensor - Ford Specific Data | 95.77 % | |
| Fuel Tank Pressure Voltage, no FMEM - Ford Specific Data | 2.626 V | |
| EGR DPFE sensor input at the time of misfire - Ford Specific Data | 1.518 V | |
| Intake air temperature at the time of misfire - Ford Specific Data | 72 deg | |
| Engine load at the time of misfire - Ford Specific Data | 26.67 % | |
| 1=In drive during the time of misfire - Ford Specific Data | on | |
| Engine running time at the time of misfire - Ford Specific Data | 78 sec | |
| Engine rpm at the time of misfire - Ford Specific Data | 1469.3 RPM | |
| Engine-off soak time at the time of misfire - Ford Specific Data | 175.5 min | |
| Throttle position at the time of misfire - Ford Specific Data | 1.142 V | |
| Vehicle speed at the time of misfire - Ford Specific Data | 11.5 MPH | |
| 1=MIL requested to be on - Ford Specific Data | off | |
| Low word of cumulative # of misfires - Ford Specific Data | 2 | |
| 1=Currently misfiring - Ford Specific Data | off | |
| Transmission Fluid Temperature, no FMEM - Ford Specific Data | 134.2 degF | |
| PRNDL position (1,2,3,4,5=neutral, 6=reverse, 7=park) - Ford Specific | P | |

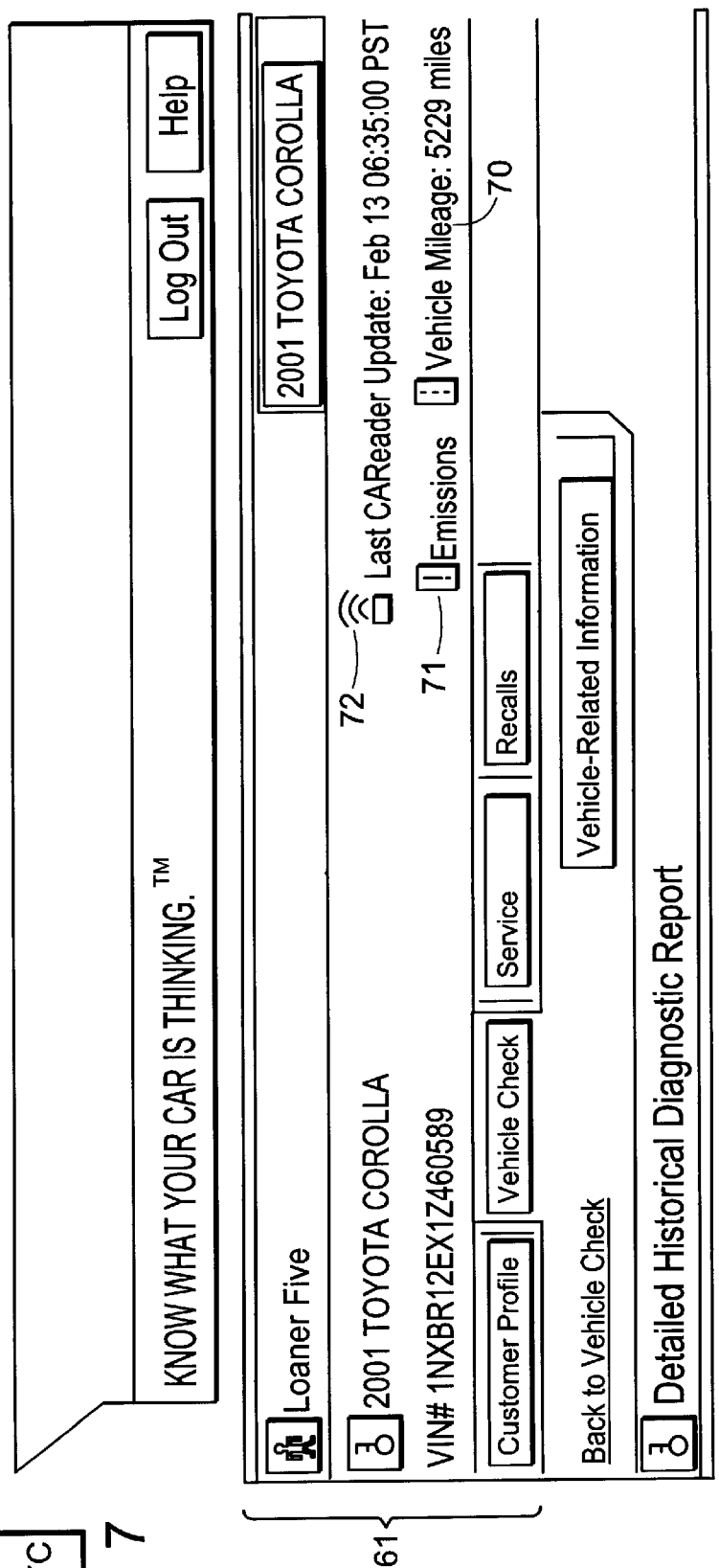

INTERNET-BASED VEHICLE-DIAGNOSTIC SYSTEM

TECHNICAL FIELD

The present invention relates to use of an internet-based system for diagnosing a vehicle's performance.

BACKGROUND

The Environmental Protection Agency (EPA) requires vehicle manufacturers to install on-board diagnostics (OBD-II) for monitoring light-duty automobiles and trucks beginning with model year 1996. OBD-II systems (e.g., microcontrollers and sensors) monitor the vehicle's electrical and mechanical systems and generate data that are processed by a vehicle's engine control unit (ECU) to detect any malfunction or deterioration in the vehicle's performance. Most ECUs transmit status and diagnostic information over a shared, standardized electronic buss in the vehicle. The buss effectively functions as an on-board computer network with many processors, each of which transmits and receives data. The primary computers in this network are the vehicle's electronic-control module (ECM) and power-control module (PCM). The ECM typically monitors engine functions (e.g., the cruise-control module, spark controller, exhaust/gas recirculator), while the PCM monitors the vehicle's power train (e.g., its engine, transmission, and braking systems). Data available from the ECM and PCM include vehicle speed, fuel level, engine temperature, and intake manifold pressure. In addition, in response to input data, the ECU also generates 5-digit 'diagnostic trouble codes' (DTCs) that indicate a specific problem with the vehicle. The presence of a DTC in the memory of a vehicle's ECU typically results in illumination of the 'Service Engine Soon' light present on the dashboard of most vehicles.

Data from the above-mentioned systems are made available through a standardized, serial 16-cavity connector referred to herein as an 'OBD-II connector'. The OBD-II connector typically lies underneath the vehicle's dashboard. When a vehicle is serviced, data from the vehicle's ECM and/or PCM is typically queried using an external engine-diagnostic tool (commonly called a 'scan tool') that plugs into the OBD-IL connector. The vehicle's engine is turned on and data are transferred from the engine computer, through the OBD-II connector, and to the scan tool. The data are then displayed and analyzed to service the vehicle. Scan tools are typically only used to diagnose stationary vehicles or vehicles running on a dynamometer.

Some vehicle manufacturers also include complex electronic systems in their vehicles to access and analyze some of the above-described data. For example, General Motors includes a system called 'On-Star' in some of their high-end vehicles. On-Star collects and transmits data relating to these DTCs through a wireless network. On-Star systems are not connected through the OBD-II connector, but instead are wired directly to the vehicle's electronic system. This wiring process typically takes place when the vehicle is manufactured.

SUMMARY

Embodiments of the invention can provide a wireless, internet-based system for monitoring a vehicle. For example, embodiments of the invention can access data from a vehicle, analyze it, and make it available to organizations (e.g. an automotive dealership or service center) over the internet so that the vehicle's performance can be analyzed accurately and in real-time. Data are accessed through the same OBD-II connector used by conventional scan tools. In this way, the invention collects data similar to those collected by scan tools, only they are collected in real-time while the vehicle is actually being driven. The invention also provides an Internet-based web site to view these data. The web site also includes functionality to modify the type of data being collected, e.g. the type of diagnostic data or the frequency at which it is collected. The data can be collected and viewed over the Internet without having to bring the vehicle in for service. The data include, for example, DTCs and mechanical and electrical data stored in the vehicle's engine computer.

In one aspect, the invention features a system for monitoring operational characteristics of a vehicle. The system includes a computer in the vehicle, and a wireless appliance in electrical contact with the computer. The wireless appliance includes a data-transmission component configured to transmit data associated with the operational characteristics over a network to a host computer system, and to receive over the network data from the host computer system.

In another aspect, the invention features a device for monitoring operational characteristics of a vehicle. The device includes a wireless appliance including a data transmission component configured to communicate data associated with the operational characteristics over a network to a host computer.

In another aspect, the invention features a device for monitoring operational characteristics of a vehicle. The device includes a wireless appliance including a data transmission component configured to receive data associated with the operational characteristics over a network from a host computer.

In a further aspect, the invention features a system for monitoring operational characteristics of a vehicle. The system includes a host computer and a wireless appliance including a data transmission component configured to communicate data associated with the operational characteristics over a network to the host computer. In some embodiments, the wireless appliance is in the vehicle. In certain embodiments, the host computer is external to the vehicle.

In one aspect, the invention features a system for monitoring operational characteristics of a vehicle. The system includes a host computer and a wireless appliance including a data transmission component configured to receive data associated with the operational characteristics over a network from the host computer. In some embodiments, the wireless appliance is in the vehicle. In certain embodiments, the host computer is external to the vehicle.

Embodiments of the invention can include one or more of the following features and/or advantages.

The 'wireless appliance' used in the above-described invention features a data-transmitting component (e.g. a radio or cellular modem) that sends out the data packet over an existing wireless network (e.g., Cingular's Mobitex network). Such a wireless appliance is described in the application WIRELESS DIAGNOSTIC SYSTEM FOR VEHICLES, filed Feb. 1, 2001, the contents of which are incorporated herein by reference.

In embodiments, the communication software supported by the data-collection component features a schema component that identifies the diagnostic data to be collected from the vehicle's computer. The schema component features an address that describes a location of a diagnostic datum in the vehicle's computer memory. It can also describe a time or frequency that the data-collection component collects data from the vehicle's computer, or a time or frequency that the data-transmission component transmits an outgoing data packet. The schema component is typically an ASCII or binary data file that is configured to be processed by the communication software.

In the above-mentioned description, the term 'supported' means that an executable version of the communication software can run as a computer program on a microprocessor, microcontroller, or comparable, semiconductor-based device resident on the data-collection component.

The host computer system typically features at least one web-hosting computer that hosts the web site, and at least one, separate gateway computer that receives the outgoing data packet and sends the incoming data packet. In this embodiment the web site features a first web page that displays at least a single vehicle diagnostic datum. For example, the first web page can include data fields describing: i) a name of the diagnostic datum; ii) units corresponding to the diagnostic datum; and iii) a numerical value corresponding to the diagnostic datum. Multiple sets of diagnostic data, each received by the host computer system at a unique time and date, can also be displayed on the web page. The page can also include a graphical representation of the sets of diagnostic data, e.g. a time-dependent plot of the data.

In typical applications the set of diagnostic data includes at least one of the following: diagnostic trouble codes, vehicle speed, fuel level, fuel pressure, miles per gallon, engine RPM, mileage, oil pressure, oil temperature, tire pressure, tire temperature, engine coolant temperature, intake-manifold pressure, engine-performance tuning parameters, alarm status, accelerometer status, cruise-control status, fuel-injector performance, spark-plug timing, and a status of an anti-lock braking system.

In other embodiments the web site further includes a login web page, in communication with a database component, where a user enters a user name and password. The database component is configured to verify if the user is associated with multiple vehicles. If this is the case, the web site includes a second web page that displays vehicle diagnostic data corresponding to each vehicle.

In still other embodiments the web site includes a third web page that features a mechanism for sending the incoming data packet over the network. For example, the third web page can include a mechanism for selecting a new schema wherein a list of parameters is provided, each of which can be extracted from the vehicle's computer.

The gateway computer that receives the outgoing data packet and sends the incoming data packet is connected to the network, typically through an Internet-based connection or a digital communication line.

The system can also include a secondary computer system that connects to the host computer system through the Internet to display the web site. Alternatively, the system includes a hand-held device, e.g. a cellular telephone or personal digital assistant, which connects to the host computer system through the Internet. The host computer system can also be configured to send an electronic mail message that includes all or part of the vehicle diagnostic data.

In other embodiments, the wireless appliance is configured to send an outgoing data packet that indicates a location of a transmitting base station. In this case, the host computer system includes software that analyzes this location to determine an approximate location of the vehicle, which can then be displayed on a web page.

In the above-described method, the term "airlink" refers to a standard wireless connection (e.g., a connection used for wireless telephones or pagers) between a transmitter and a receiver. This term describes the connection between a data-transmission component and the wireless network that supports data transmitted by this component. Also in the above-described method, the 'generating' and 'transmitting' steps can be performed at any time and with any frequency, depending on the diagnoses being performed. For a 'real-time' diagnoses of a vehicle's engine performance, for example, the steps may be performed at rapid time or mileage intervals (e.g., several times each minute, or every few miles). Alternatively, other diagnoses (e.g. an emissions or 'smog' check) may require the steps to be performed only once each year or after a large number of miles are driven. Alternatively, the vehicle may be configured to automatically perform these steps at predetermined or random time intervals. As described in detail below, the transmission frequency can be changed in real time by downloading a new 'schema' to the wireless appliance through the wireless network.

The term 'web page' refers to a standard, single graphical user interface or 'page' that is hosted on the Internet or world-wide web. Web pages typically include: 1) a 'graphical' component for displaying a user interface (typically written in a computer language called 'HTML' or hypertext mark-up language); an 'application' component that produces functional applications, e.g. sorting and customer registration, for the graphical functions on the page (typically written in, e.g., C++ or Java); and a database component that accesses a relational database (typically written in a database-specific language, e.g. SQL*Plus for Oracle databases). A 'web site' typically includes multiple web pages, many of which are 'linked' together, that are accessed through a series of 'mouse clicks'.

The invention has many advantages. In particular, wireless transmission of data from a vehicle, followed by analysis and display of these data using a web site hosted on the internet, makes it possible to diagnose the performance of a vehicle in real-time from virtually any location that has internet access. This ultimately means the problems with the vehicle can be efficiently diagnosed, and in some cases predicted before they actually occur. Moreover, data from the vehicle can be queried and analyzed while the vehicle is actually in use to provide a relatively comprehensive diagnosis that is not possible using a conventional scan tool. An internet-based system for vehicle diagnoses can also be easily updated and made available to a large group of users simply by updating software on the web site. In contrast, a comparable updating process for a series of scan tools can only be accomplished by updating the software on each individual scan tool. This, of course, is time-consuming, inefficient, and expensive, and introduces the possibility that many scan tools within a particular product line will not have the very latest software.

The wireless appliance used to access and transmit the vehicle's data is small, low-cost, and can be easily installed in nearly every vehicle with an OBD-II connector in a matter of minutes. It can also be easily transferred from one vehicle to another, or easily replaced if it malfunctions.

The wireless appliance can also collect data that is not accessible using a scan tool. For example, data that indicates a vehicles performance can be collected while the vehicle is actually driven. For example, it may be required to collect data while a vehicle is driving up a hill or pulling a load. Scan tools, in contrast, can only collect data from a stationary vehicle in a service bay. Service technicians using the wireless appliance, for example, can analyze DTCs and diagnostic data while the vehicle is being driven. The system described herein also makes data available in real-time, thereby allowing the technicians to order parts and schedule resources for service appointments before the vehicle is actually brought into the dealership.

Moreover, software schemas that update the type or frequency of the vehicle's data can be directly downloaded to specific wireless appliances or groups of wireless appliances (corresponding, e.g., to a fleet of vehicles or a group of vehicles having the same year, make, or model). This makes it possible to collect data that specifically elucidates a problem with the vehicle that may occur only under certain driving conditions.

The resulting data, of course, have many uses for automotive dealerships, vehicle-service organizations, vehicle-renting firms, insurance companies, vehicle owners, organizations that monitor emission performance (e.g., the EPA), manufacturers of vehicles and related parts, survey organizations (e.g., J.D. Power) and vehicle service centers. In general, these data yield information that benefits the consumer, vehicle and parts manufacturers, vehicle service centers, and the environment.

These and other advantages of the invention are described in the following detailed disclosure and in the claims.

DESCRIPTION OF THE DRAWINGS

The features and advantages of the present invention can be understood by reference to the following detailed description taken with the drawings, in which:

FIG. 5 is a screen capture of a web page from the web site of FIG. 4 that shows a list of customers corresponding to a single dealership;

DETAILED DESCRIPTION

Figure 1:
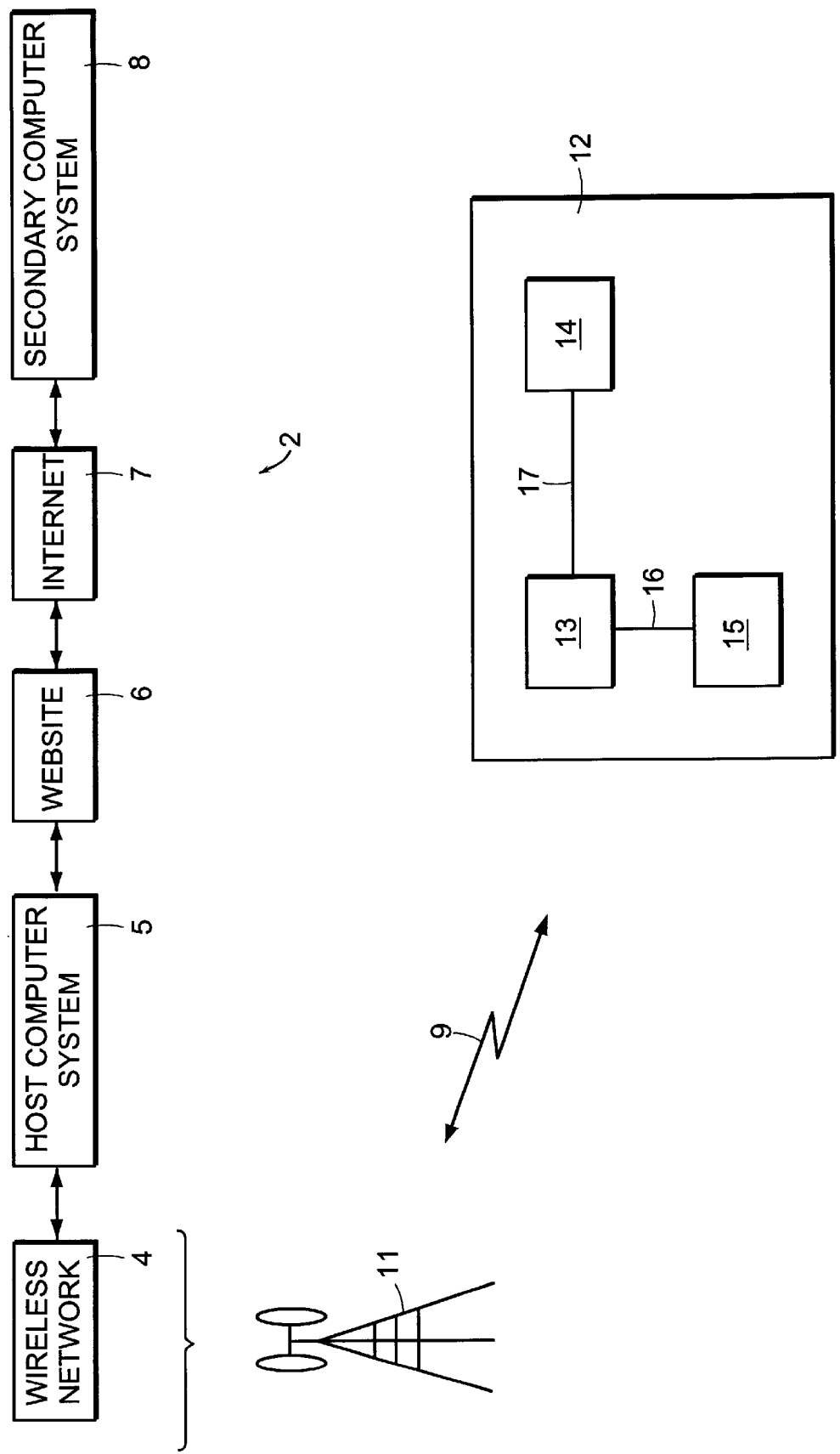
FIG. 1 is a schematic drawing of system of the invention featuring a single vehicle transmitting data across an airlink to an Internet-accessible host computer system.

FIG. 1 shows a schematic drawing of an Internet-based vehicle-diagnostic system 2 according to the invention. The system 2 measures diagnostic data from a vehicle 12 and transmits it over an airlink 9 to a web site 6 accessible through the Internet 7. The system 2 functions in a bi-directional manner, i.e. in addition to receiving data from a vehicle, a user logged onto the web site 6 can specifically select the diagnostic data to be measured and the frequency at which it is measured. These properties are sent through the airlink 9 to the wireless appliance 13 that re-measures the diagnostic data from the vehicle 12. In this way, the invention functions effectively as an Internet-based 'scan tool' that diagnoses any vehicle that includes a wireless appliance. The host vehicle can be diagnosed at any time it is being driven using an Internet-accessible web site.

The wireless appliance 13 disposed within the vehicle 12 collects diagnostic data from the vehicle's engine computer 15. The engine computer 15 retrieves data stored in its memory and sends it along a cable 16 to the wireless appliance 13. The appliance 13 typically connects to the OBD-II connector located under the dash in all vehicles manufactured after 1996. It includes a data-collection component (not shown in the figure) that formats the data in a packet and then passes the packet to a data-transmission component, which sends it through a cable 17 to an antenna 14. To generate the data, the wireless appliance 13 queries the vehicle's computer 15 at a first time interval (e.g. every 20 seconds), and transmits a data set at a longer time interval (e.g. every 10 minutes). These time intervals are specified in a data-collection 'schema', described in more detail below.

The antenna typically rests in the vehicle's shade band, disposed just above the dashboard. The antenna 14 radiates the data packet over the airlink 9 to a base station 11 included in a wireless network 4. A host computer system 5 connects to the wireless network 4 and receives the data packets. The host computer system 5, for example, may include multiple computers, software pieces, and other signal-processing and switching equipment, such as routers and digital signal processors. Data are typically transferred from the wireless network 4 to host computer system 5 through a TCP/IP-based connection, or with a dedicated digital leased line (e.g., a frame-relay circuit or a digital line running an x0.25 protocol). The host computer system 5 also hosts a web site 6 using conventional computer hardware (e.g. computer servers for a database and the web site) and software (e.g., web server and database software). A user accesses the web site 6 through the Internet 7 from a secondary computer system 8. The secondary computer system 8, for example, may be located in an automotive service center.

The wireless appliance that provides diagnostic data to the web site is described in more detail in WIRELESS DIAGNOSTIC SYSTEM FOR VEHICLES, filed Feb. 1, 2001, the contents of which have been previously incorporated by reference. The appliance transmits a data packet that contains information of its status, an address describing its destination, an address describing its origin, and a 'payload' that contains the above-described diagnostic data from the vehicle, or a schema from the web site. These data packets are transmitted over conventional wireless network, such as Cingular's Mobitex network.

Figure 2:
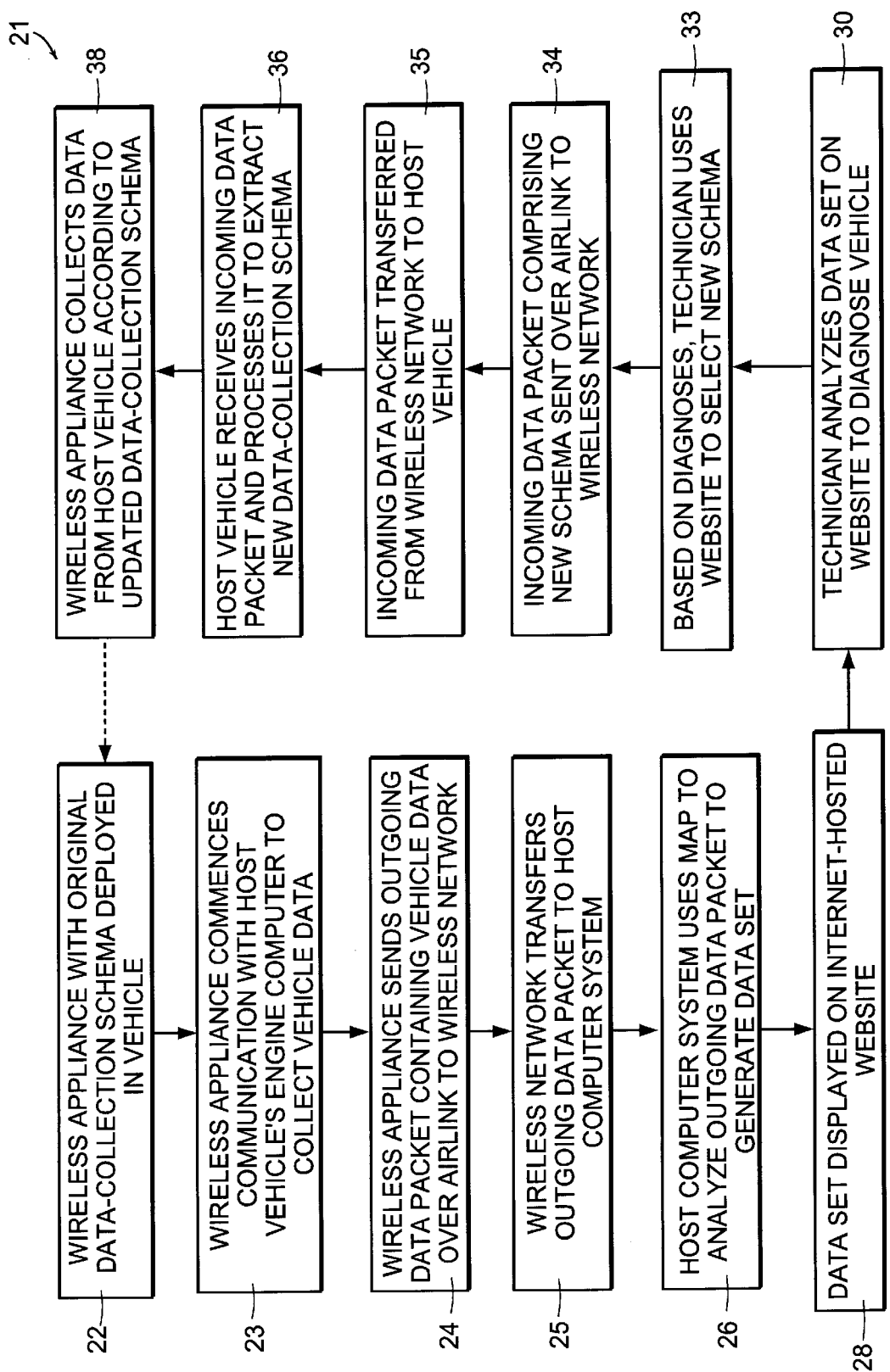
FIG. 2 is a flow chart describing a method used by the system of FIG. 1 to diagnose vehicles.

FIG. 2 shows a method 21 describing how the system 2 in FIG. 1 typically operates. As described above, the wireless appliance includes a data-collection component that, in turn, includes a microcontroller that has software and a data-collection 'schema' loaded in the microcontroller's memory. The schema is essentially a 'map' that describes the data that the wireless appliance collects from the vehicle's engine computer, and its corresponding location in the computer's memory. A schema specific to a given type of vehicle is typically loaded onto the microcontroller before the wireless appliance is installed in the vehicle (step 22 in FIG. 2). During operation, the appliance communicates with the vehicle's engine computer as described above (step 23). The appliance collects diagnostic data defined by the schema, formats these data in a data packet, and then sends an outgoing packet over the airlink to a wireless network (step 24). The network transfers the data packet to the host computer system as described above (step 25). There, the host computer system analyzes the data packet using a 'map' that corresponds to the schema to generate a data set (step 26). Every schema has a corresponding map. The map includes, for example, a list of the collected data, an acronym and unit for each datum. The data set, acronym, and units are then displayed on the web site (step 28) where they can be viewed by any 'registered' user (i.e., a user with a username and corresponding password) with Internet connectivity.

Figure 6A:
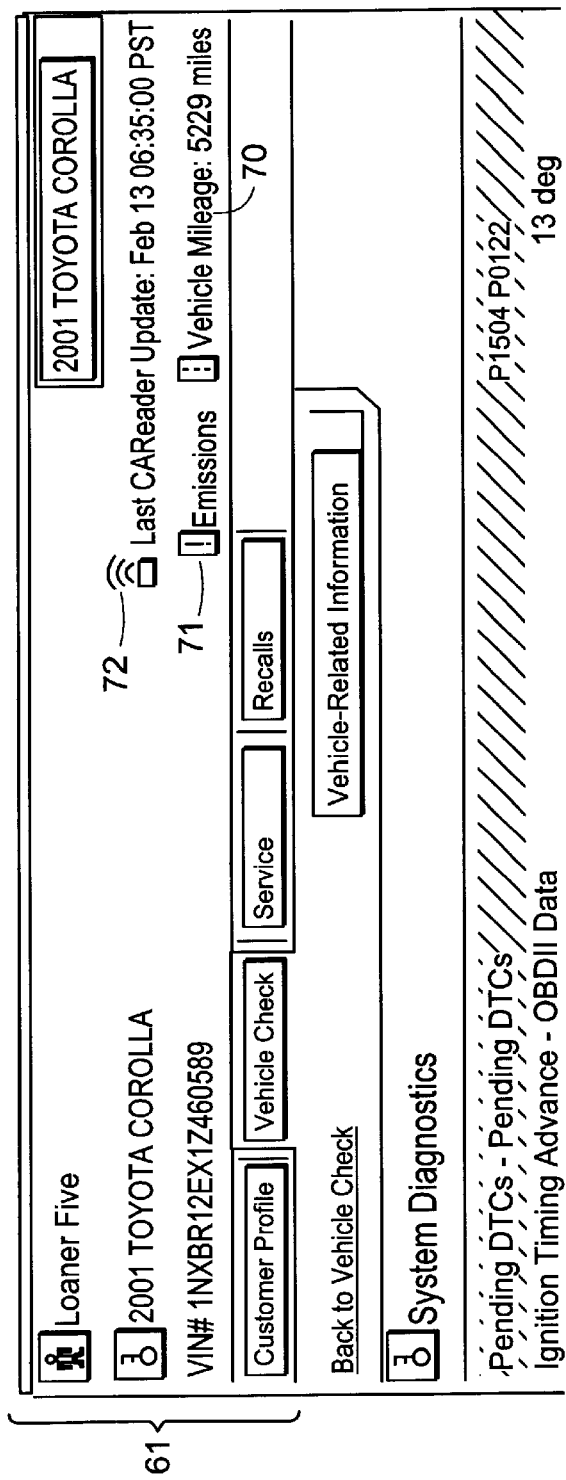
FIG. 6 is a screen capture of a web page related to the web page of FIG. 5 that shows diagnostic data for a customer's vehicle.
Figure 7B:
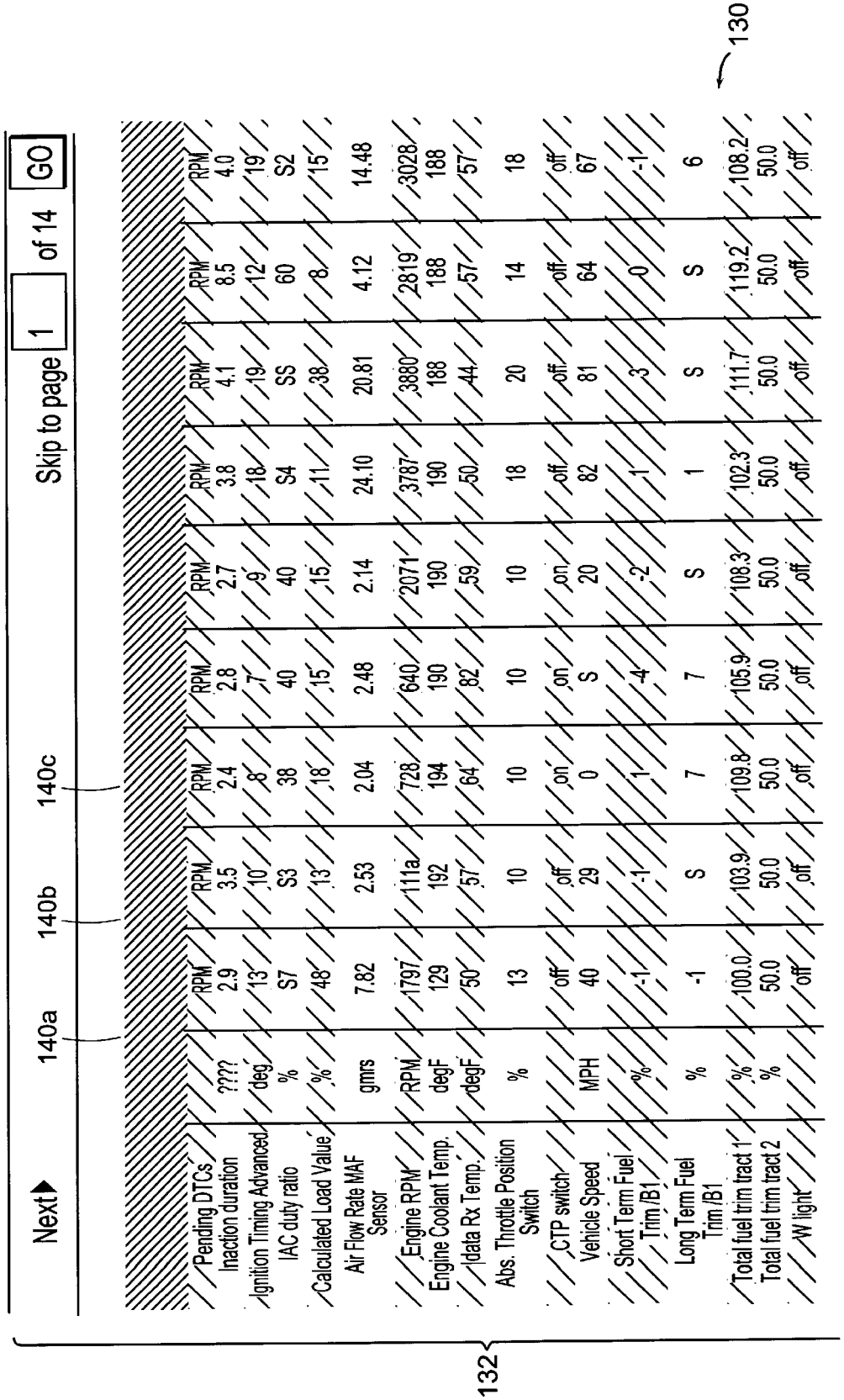
FIG. 7 is a screen capture of a web page from the web site of FIG. 1 that shows several time-dependent sets of diagnostic data from a customer's vehicle.
Figure 7C:
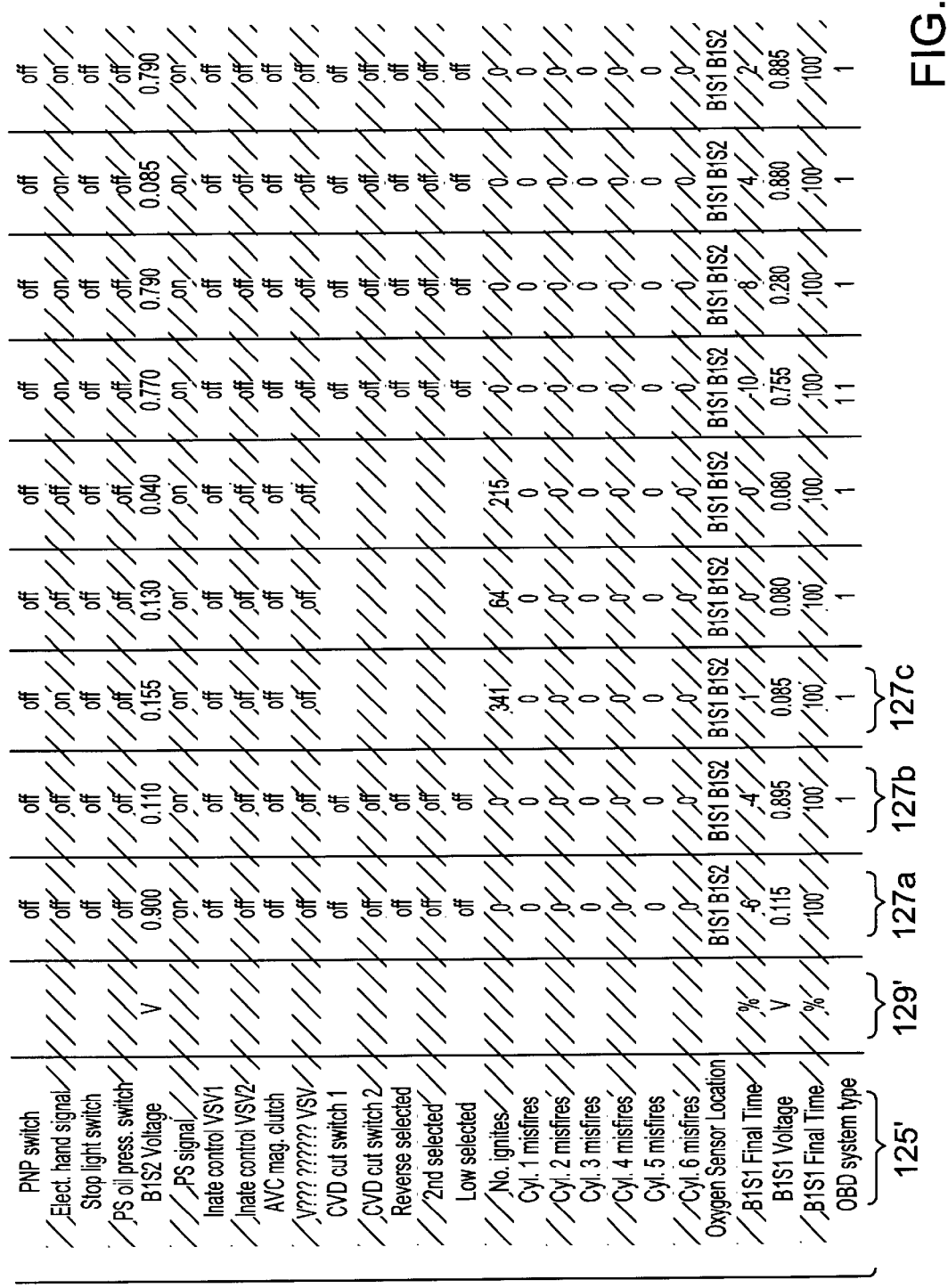

In one mode of operation, a technician working at a vehicle-service center logs into the web site and analyzes the data set corresponding to a particular vehicle to diagnose a potential mechanical or electrical problem (step 30). Specific web pages that display the data set are shown in FIGS. 5–7, below. Based on the analysis, the technician may decide that additional data are required, or that data need to be collected and transmitted at a higher or lower frequency. In this case the technician uses the web site to select a new schema (step 32) and then sends an incoming data packet that includes a new schema over the wireless network to the wireless appliance included in the vehicle being diagnosed (step 34). In typical applications, the vehicle is specifically addressed using a serial number that corresponds to the data-transmitting component. This serial number is typically an 8 or 10-digit number that functions effectively as a 'phone number' corresponding to the data-transmitting component. This number is included in the data packet, and is used by the wireless network to transfer the packet to the host vehicle (step 35). The host vehicle receives the packet and processes it to extract the new data-collection schema (step 36). The wireless appliance uses the updated schema to extract a revised set of data from the vehicle's engine computer, or send out data at a revised frequency (step 38). In other applications, the new schema can be used to query a set of data that is relevant to a DTC registered by the vehicle, or to 'clear' a DTC when it is deemed to no longer be problematic. Once these data are collected, the method 21 can then be repeated as described above to further diagnose the vehicle.

Figure 3:
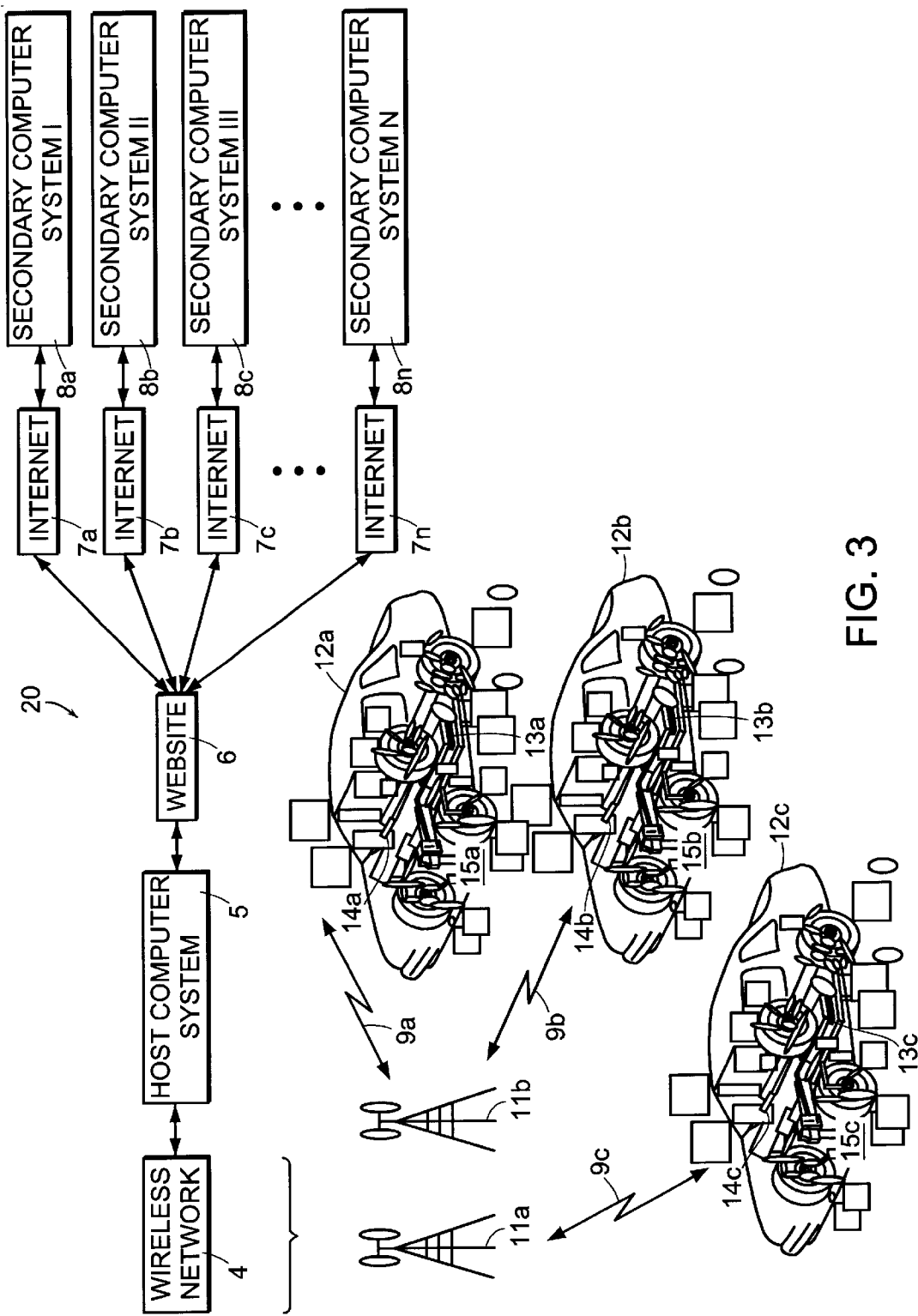
FIG. 3 is a schematic drawing of the system of the invention featuring multiple vehicles, each transmitting data across an airlink to an Internet-accessible host computer system.

The above-described system is designed to work with multiple vehicles and multiple secondary computer systems, each connected to the web site through the Internet. FIG. 3 illustrates this point, showing a system 20, similar to the system 2 of FIG. 1, used to diagnose a set of vehicles 12a–12c. The system 20 operates similarly as that described above: a wireless appliance 13a–13c disposed in each vehicle collects data from the vehicles' respective engine computers 15a–15c, formats these data into data packets, and then sends the data packets using antennae 14a–14c over a series of airlinks 9a–9c to a base stations 11a–11b featured in a wireless network 4. Each vehicle may include a unique schema. In this case, two vehicles 12a, 12b send their respective data packets to a single base station 11b, while a single vehicle 12c sends its data packet to a single base station 11a. The number and location of the base stations depends on the wireless network; in the Mobitex network there is typically one base station per zip code in most major cities. Once the data packets are received, the wireless network 4 routes them to the host computer system 5. They are then processed with a corresponding map and consequently formatted as a series of data sets and displayed on the web site 6. A series of secondary computer systems 8a–8c, 8n view the web site using separate connections over the Internet 7a–7c, 7n. Users of the secondary computer systems 8a–8c, 8n associated with organizations containing a series of vehicles (e.g., a vehicle dealership) can view data from all vehicles associated with the organization. In contrast, individual vehicle owners can only view data from their particular vehicle.

Figure 4:
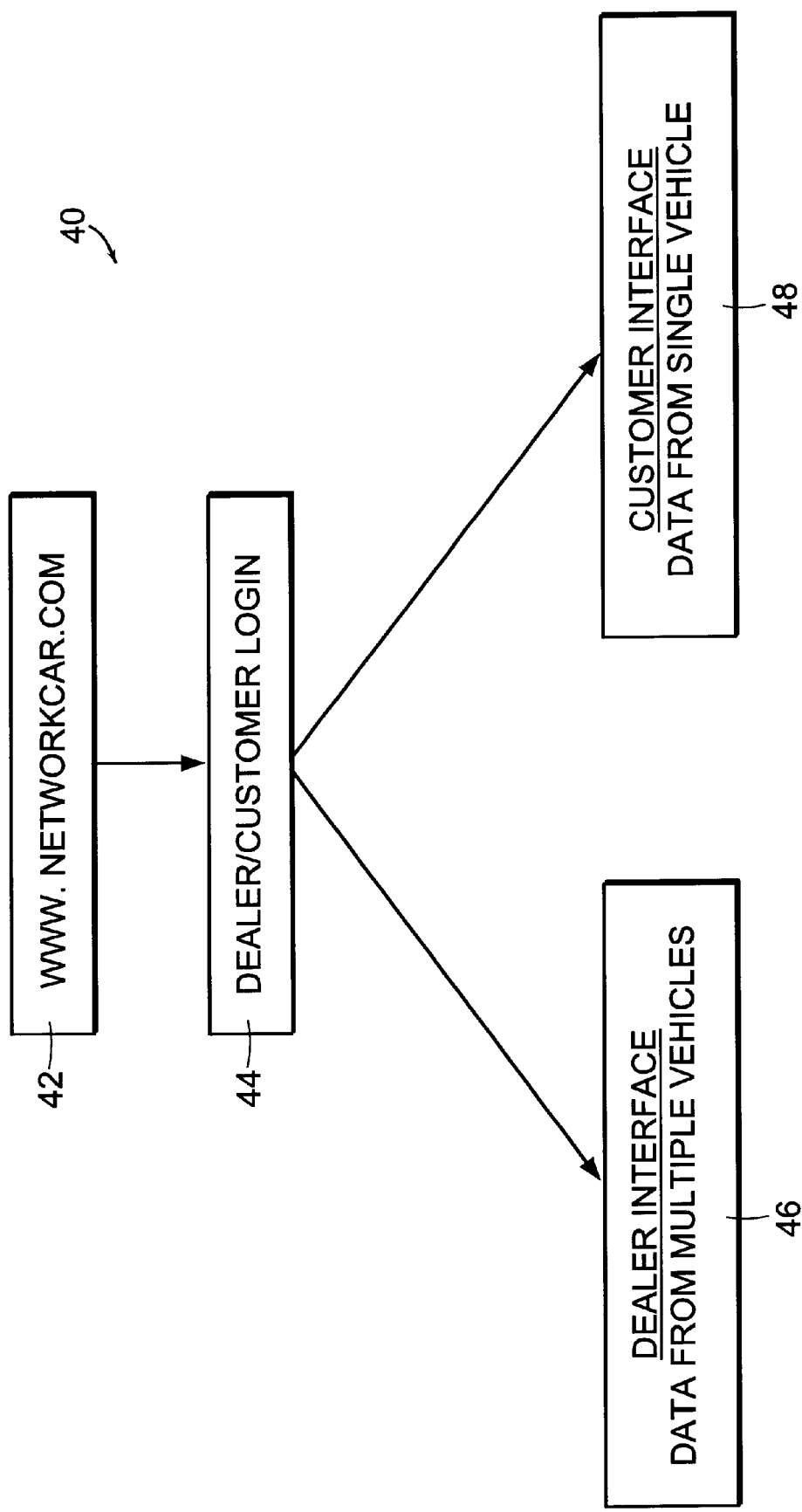
FIG. 4 is a schematic drawing of a web site with a login process that renders a series of web pages associated with either a dealer or customer interface.

FIG. 4 illustrates this concept in more detail. The figure shows a schematic drawing of a login process 40 for a web site 42 that displays diagnostic data for a series of 'customer' vehicles associated with a vehicle 'dealership'. Within each vehicle is a wireless appliance that retrieves data from the vehicle's engine computer, and then sends these data, formatted in a data packet, through a wireless network. The data eventually are transferred from the network, through a host computer system, to the web site 42 where they are formatted, displayed and processed as described below.

A user 'logs' into the web site 42 through a login interface 44 by entering a username and password that, once entered, are compared to a database associated with the web site. The comparison determines if the user is a dealer or a customer. If the user is determined to be a dealer, the web site renders a dealer interface 46 that contains, e.g., diagnostic information for each purchased vehicle. Users viewing the dealer interface 46 do not have access to data corresponding to vehicles sold by other dealerships. If the user is determined to be a customer, the web site 42 renders a customer interface 48 that contains diagnostic information for one or more vehicles corresponding to the customer. Each customer using the web site 42 is associated with a unique customer interface.

FIG. 5 is a screen capture of a web page 50 included in the dealer interface indicated in FIG. 4. The host computer system renders this page once the user is determined to be a dealer following the login process. The screen capture features a customer list 52 corresponding to a single dealership that includes: customer names 56 for each customer; a vehicle description 58 that includes the vehicle's year, make and model; a unique 17-digit vehicle identification number ('VIN') 60 that functions as the vehicle's serial number; and an 'alert' listing 62 that provides a number of alerts for each vehicle. The 'alerts' are described in more detail in the application entitled 'INTERNET-BASED SYSTEM FOR MONITORING VEHICLES', filed Mar. 15, 2001, the contents of which are incorporated herein by reference. In general, an alert is generated when data, sent from the vehicle's wireless appliance to the host computer system, indicates either 1) a mechanical/electrical problem with the vehicle; or 2) that a scheduled maintenance is recommended for the vehicle. For example, the customer list 52 includes a data field 54 that lists the user 'Five, Loaner' with an associated 2001 Toyota Corolla. The data field 54 also includes the number '1' in the alert listing 62, indicating the presence of a single alert.

FIG. 6 shows a web page 120 that lists a detailed data set 122 transmitted from the vehicle-based wireless appliance to the host computer system. The host computer system receives the data set 122 at a time described by a time/date stamp 72 listed in the header 61. The data set 122 includes a data parameter name 125, a corresponding numerical value 127, and a description of the units 129 of the numerical value 127. As described above, these values are specified in the map corresponding to the data-collection schema used to extract the data from the vehicle. Some of the numerical values (e.g., the status of the 'MIL light' 131) are dimensionless, i.e. they do not have units. To generate the numerical values 127, the wireless appliance queries the vehicle's ECU at a set time interval (e.g. every 20 seconds), and transmits a data set 122 at a longer time interval (e.g. every 10 minutes). Thus, the numerical values in the data set can represent 'instantaneous' values that result from a single query to the ECU, or they can represent 'average' values that result from an average from multiple sequential queries.

The data parameters within the set 122 describe a variety of electrical, mechanical, and emissions-related functions in the vehicle. Several of the more significant parameters from the set are listed in Table 1, below:

Pending DTCs
Ignition Timing Advance
Calculated Load Value
Air Flow Rate MAF Sensor
Engine RPM
Engine Coolant Temperature
Intake Air Temperature
Absolute Throttle Position Sensor
Vehicle Speed
Short-Term Fuel Trim
Long-Term Fuel Trim
MIL Light Status
Oxygen Sensor Voltage
Oxygen Sensor Location
Delta Pressure Feedback EGR Pressure Sensor
Evaporative Purge Solenoid Dutycycle
Fuel Level Input Sensor
Fuel Tank Pressure Voltage
Engine Load at the Time of Misfire
Engine RPM at the Time of Misfire
Throttle Position at the Time of Misfire
Vehicle Speed at the Time of Misfire
Number of Misfires
Transmission Fluid Temperature
PRNDL position (1,2,3,4,5=neutral, 6=reverse)
Number of Completed OBDII Trips
Battery Voltage Table 1—Parameters Monitored from Vehicle The parameters listed in Table 1 were measured from a Ford Crown Victoria. Similar sets of data are available for nearly all vehicles manufactured after 1996 that have an OBD-II connector. In addition to these, hundreds of other vehicle-specific parameters are also available from the vehicle's computer.

The data set 122 shown in FIG. 6 represents the most recent data sent from the vehicle's wireless appliance to the host computer system. Data sets sent at earlier times can also be analyzed individually or in a group to determine the vehicle's performance. These 'historical data', for example, can by used to determine trends in the vehicle's performance. In some cases data analyzed in this manner can be used to predict potential problems with the vehicle before they actually occur.

Referring to FIG. 7, a web page 130 includes a historical data set 132 containing data parameter names 125', units 129' and a series of data sets 127a–127c transmitted at earlier times from the in-vehicle wireless appliance. Each of these data sets is similar to the data set 122 shown in FIG. 6, but is received by the host computer system at an earlier time as indicated by a time stamp 140a–140c. For example, the first two data sets 127c, 127b where transmitted with time stamps 140b, 140c of 11:42 and 11:52 on Feb. 12, 2001; the last data set 127a was transmitted the next morning with a time stamp 140a of 6:05.

Other embodiments are also within the scope of the invention. In particular, the web pages used to display the data can take many different forms, as can the manner in which the data are displayed. Web pages are typically written in a computer language such as 'HTML' (hypertext mark-up language), and may also contain computer code written in languages such as java for performing certain functions (e.g., sorting of names). The web pages are also associated with database software (provided by companies such as Oracle) that is used to store and access data. Equivalent versions of these computer languages and software can also be used.

Different web pages may be designed and accessed depending on the end-user. As described above, individual users have access to web pages that only show data for their particular vehicle, while organizations that support a large number of vehicles (e.g. dealerships or distributors) have access to web pages that contain data from a collection of vehicles. These data, for example, can be sorted and analyzed depending on vehicle make, model, odometer reading, and geographic location. The graphical content and functionality of the web pages may vary substantially from what is shown in the above-described figures. In addition, web pages may also be formatted using standard wireless access protocols (WAP) so that they can be accessed using wireless devices such as cellular telephones, personal digital assistants (PDAs), and related devices.

The web pages also support a wide range of algorithms that can be used to analyze data once it is extracted from the data packets. For example, the above-mentioned alert messages are sent out in response to a DTC or when a vehicle approaches a pre-specified odometer reading. Alternatively, the message could be sent out when a data parameter (e.g. engine coolant temperature) exceeded a predetermined value. In some cases, multiple parameters (e.g., engine speed and load) can be analyzed to generate an alert message. In general, an alert message can be sent out after analyzing one or more data parameters using any type of algorithm. These algorithms range from the relatively simple (e.g., determining mileage values for each vehicle in a fleet) to the complex (e.g., predictive engine diagnoses using 'data mining' techniques). Data analysis may be used to characterize an individual vehicle as described above, or a collection of vehicles, and can be used with a single data set or a collection of historical data. Algorithms used to characterize a collection of vehicles can be used, for example, for remote vehicle or parts surveys, to characterize emission performance in specific geographic locations, or to characterize traffic.

Other embodiments of the invention include algorithms for analyzing data to characterize vehicle accidents and driving patterns for insurance purposes; algorithms for determining driving patterns for use-based leasing; and algorithms for recording vehicle use and driving patterns for tax purposes. In general, any algorithm that processes data collected with the above-described method is within the scope of the invention.

In other embodiments, additional hardware can be added to the in-vehicle wireless appliance to increase the number of parameters in the transmitted data. For example, hardware for global-positioning systems (GPS) may be added so that the location of the vehicle can be monitored along with its data. Or the radio modem used to transmit the data may employ a terrestrial GPS system, such as that available on modems designed by Qualcomm, Inc. In still other embodiments, the location of the base station that transmits the message can be analyzed to determine the vehicle's approximate location. In addition, the wireless appliance may be interfaced to other sensors deployed in the vehicle to monitor additional data. For example, sensors for measuring tire pressure and temperature may be deployed in the vehicle and interfaced to the appliance so that data relating the tires' performance can be transmitted to the host computer system.

In other embodiments, the antenna used to transmit the data packet is embedded in the wireless appliance, rather than being disposed in the vehicle's shade band.

In still other embodiments, data processed using the above-described systems can be used for: remote billing/payment of tolls; remote smog and emissions checks; remote payment of parking/valet services; remote control of the vehicle (e.g., in response to theft or traffic/registration violations); and general survey information.

Still other embodiments are within the scope of the following claims.

What is claimed is:

1. A system for interfacing with an on-board diagnostic computer in a vehicle, wherein the on-board diagnostic computer monitors a set of operational characteristics of a vehicle, the system comprising:
a wireless appliance which during use communicates with the vehicle's on-board diagnostic computer, said wireless appliance comprising a wireless communication component and a data-collection component, said wireless communication component configured to receive from a wireless network a schema identifying a subset of the set of operational characteristics that are monitored by the on-board diagnostic computer, said data-collection component configured to process the received schema and to collect from the vehicle's on-board diagnostic computer data for the subset of operational characteristics identified in the received schema, said wireless communication component being further configured to transmit said collected data over the wireless network to a host computer system.

2. The system of claim 1, wherein the schema identifies an address of an operational characteristic for which data is to be collected from the vehicle's on-board diagnostic computer.

3. The system of claim 2, wherein the schema comprises an address that describes a location of a diagnostic datum in a computer memory in the vehicle.

4. The system of claim 1, wherein the host computer system is configured to transmit the schema.

5. The system of claim 1, wherein the schema comprises a field that describes a time or frequency at which the data-collection component queries the vehicle's on-board diagnostic computer.

6. The system of claim 1, wherein the schema comprises a field that describes a time or frequency at which the data-transmission component transmits data.

7. The system of claim 1, wherein the schema is an ASCII or binary data file.

8. The system of claim 1, wherein the system comprises a host computer system that includes at least one web-hosting computer that hosts an internet-based web site, and at least one, separate gateway computer that receives outgoing data and sends incoming data.

9. The system of claim 8, wherein the internet-based web site comprises a first web page that displays a vehicle diagnostic datum.

10. The system of claim 9, wherein the web site comprises a first web page that comprises data fields describing:
i) a name of a diagnostic datum;
ii) units corresponding to the diagnostic datum; and
iii) a numerical value corresponding to the diagnostic datum.

11. The system of claim 10, wherein the first web page further comprises multiple sets of diagnostic data associated with a single vehicle.

12. The system of claim 11, wherein the first web page further comprises a graphical representation of a set of diagnostic data.

13. The system of claim 9, wherein the internet-base_ web site further comprises a database component.

14. The system of claim 13, wherein the internet-base_ web site further comprises a login web page where a user enters a user name and password.

15. The system of claim 14, wherein the database component comprised by the login web page is configured to verify if the user is associated with a first or second internet-based interface.

16. The system of claim 15, wherein the web site comprises a web page that displays vehicle diagnostic data corresponding to multiple vehicles each associated with a single user.

17. The system of claim 8, wherein the host computer hosts a web site on the Internet that displays the operational characteristics, wherein the web site comprises a web page that comprises a mechanism for sending the incoming data over the network.

18. The system of claim 17, wherein the web page comprises a list of parameters that can be extracted from the vehicle's computer.

19. The system of claim 8, wherein the gateway computer that receives the outgoing data packet and sends the incoming data packet is connected to the network.

20. The system of claim 19, wherein the gateway computer is connected to a digital communication line that is connected to the network.

21. The system of claim 1, wherein the operation characteristics include at least one of the following:
diagnostic trouble codes, vehicle speed, fuel level, fuel pressure, miles per gallon, engine RPM, mileage, oil pressure, oil temperature, tire pressure, tire temperature, engine coolant temperature, intake-manifold pressure, engine-performance tuning parameters, alarm status, accelerometer status, cruise-control status, fuel-injector performance, spark-plug timing, and a status of an anti-lock braking system.

22. The system of claim 1, further comprising a secondary computer system that connects to the host computer system through the Internet and is configured to display the web site.

23. The system of claim 1, further comprising a hand-held device that connects to the host computer system through the Internet and is configured to display the web site.

24. The system of claim 23, wherein the hand-held device is a cellular telephone, computer or a personal digital assistant.

25. The system of claim 1, wherein the host computer system is further configured to send an electronic mail message that comprises all or part of the vehicle diagnostic data.

26. The system of claim 1, wherein the wireless appliance is configured to send an outgoing data packet that indicates a vehicle's location.

27. The system of claim 26, wherein the host computer system comprises software that analyzes the vehicle's location and displays it on a map.

28. The system of claim 27, wherein the web site comprises a web page that displays the map.

29. The system of claim 1, wherein the data-collection component is configured to repeatedly collect said data from the vehicle's on-board diagnostic computer data at times determined by a first schedule.

30. The system of claim 29, wherein the first schedule is specified in the schema.

31. The system of claim 1, wherein the wireless communication component is configured to repeatedly transmit the collected data over the wireless network to a host computer system at times determined by a first schedule.

32. The system of claim 31, wherein the first schedule is specified in the schema.

33. A system for monitoring a set of vehicles, the system comprising:

a host computer that hosts a web site that receives operational characteristics transmitted wirelessly from the set of vehicles, said web site programmed to enable a user to display on a first web page the operational characteristics of a single vehicle selected from among said set of vehicles and to also display the operational characteristics of multiple vehicles among said set of vehicles on a second web page, said multiple vehicles associated with a single entity.

* * * * *